United States Patent [19]

Orain

[11] Patent Number: 4,936,133
[45] Date of Patent: Jun. 26, 1990

[54] METHOD FOR MANUFACTURING AN ELEMENT HAVING GROOVED TRUNNIONS AND FORMING METHOD FOR GROOVING THE TRUNNIONS

[75] Inventor: Michel Orain, Conflans Sainte-Honorine, France

[73] Assignee: Glaenzer Spicer, Poissy, France

[21] Appl. No.: 327,771

[22] Filed: Mar. 23, 1989

[30] Foreign Application Priority Data

Mar. 23, 1988 [FR] France ................................. 88 03793

[51] Int. Cl.⁵ .............................................. B21K 1/02
[52] U.S. Cl. ......................................... 72/340; 72/402; 72/452; 29/898.043; 29/898.1; 384/213; 464/7
[58] Field of Search ................. 72/340, 402, 452, 342; 29/149.5 B, 149.4 L; 384/213, 291, 373, 398; 464/7, 11, 905; 403/39

[56] References Cited

U.S. PATENT DOCUMENTS

| 3,583,198 | 6/1971 | Drallmeier | 72/358 |
| 4,381,659 | 5/1983 | Welch et al. | 72/340 |

FOREIGN PATENT DOCUMENTS

| 236797 | 9/1987 | European Pat. Off. | |
| 1581658 | 9/1969 | France | |
| 2226228 | 11/1974 | France | |
| 48107 | 7/1981 | Japan | 72/402 |
| 119431 | 7/1983 | Japan | 72/402 |
| 779419 | 7/1957 | United Kingdom | 384/213 |

Primary Examiner—Daniel C. Crane
Attorney, Agent, or Firm—Wenderoth, Lind & Ponack

[57] ABSTRACT

The present invention is drawn to a method of manufacturing a tripod element of a homokinetic joint, and more particularly, to a method of forming grooves in the trunnions of a blank from which the tripod element is manufactured. The grooves are formed by punches which have forming edges profiled in correspondence with the grooves to be formed. The blank is positioned such that the punches occupy respective spaces each defined between two adjacent ones of the trunnions and such that the forming edges confront the trunnions, respectively. At least one of the punches is moved in a direction toward the central axis of the blank until the respective ones of the forming edges of the punches contact the trunnions to cause the blank to be self-positioned in contact with the forming edges. Subsequently, relative movement is imparted between the punches and the blank under a force sufficient to cause all of the punches to move relative to the blank in a direction toward the central axis of the blank so that the forming edges penetrate the trunnions to form grooves therein. The blank may then be subjected to heat treatment.

4 Claims, 5 Drawing Sheets

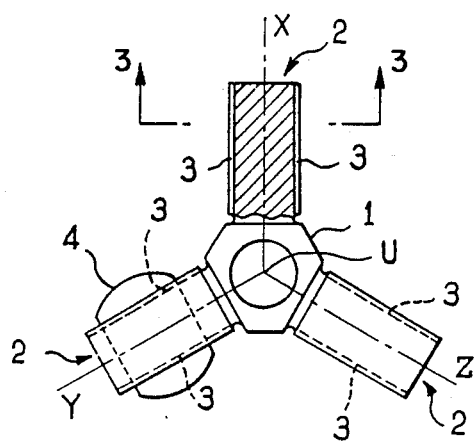
FIG_1
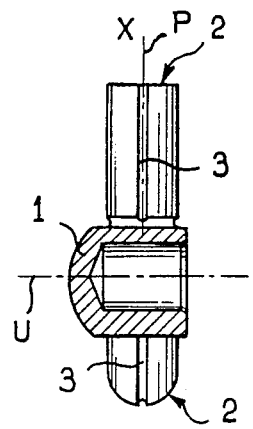
FIG_2
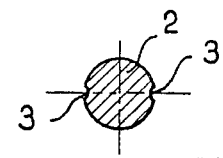
FIG_3
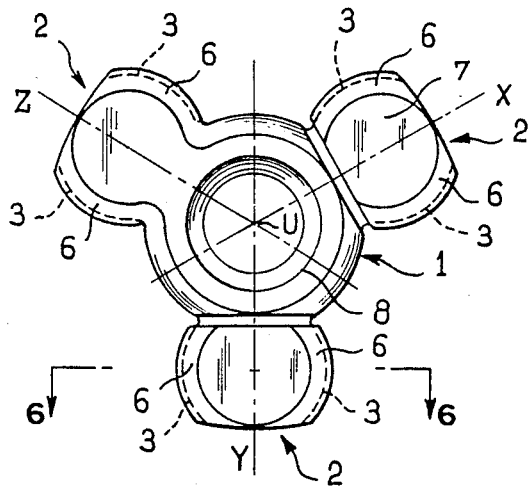
FIG_4
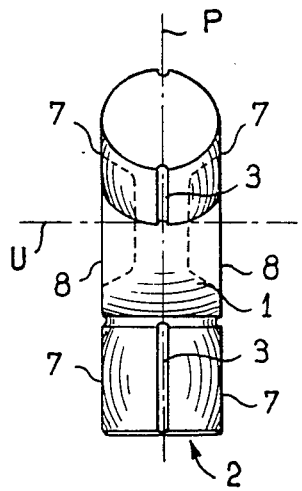
FIG_5
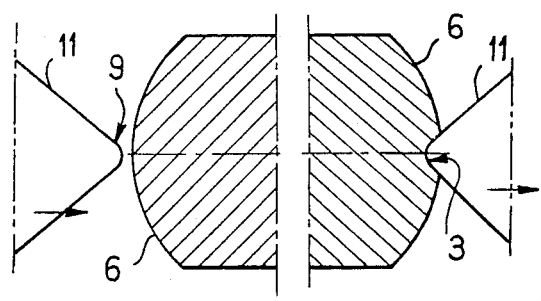
FIG_6

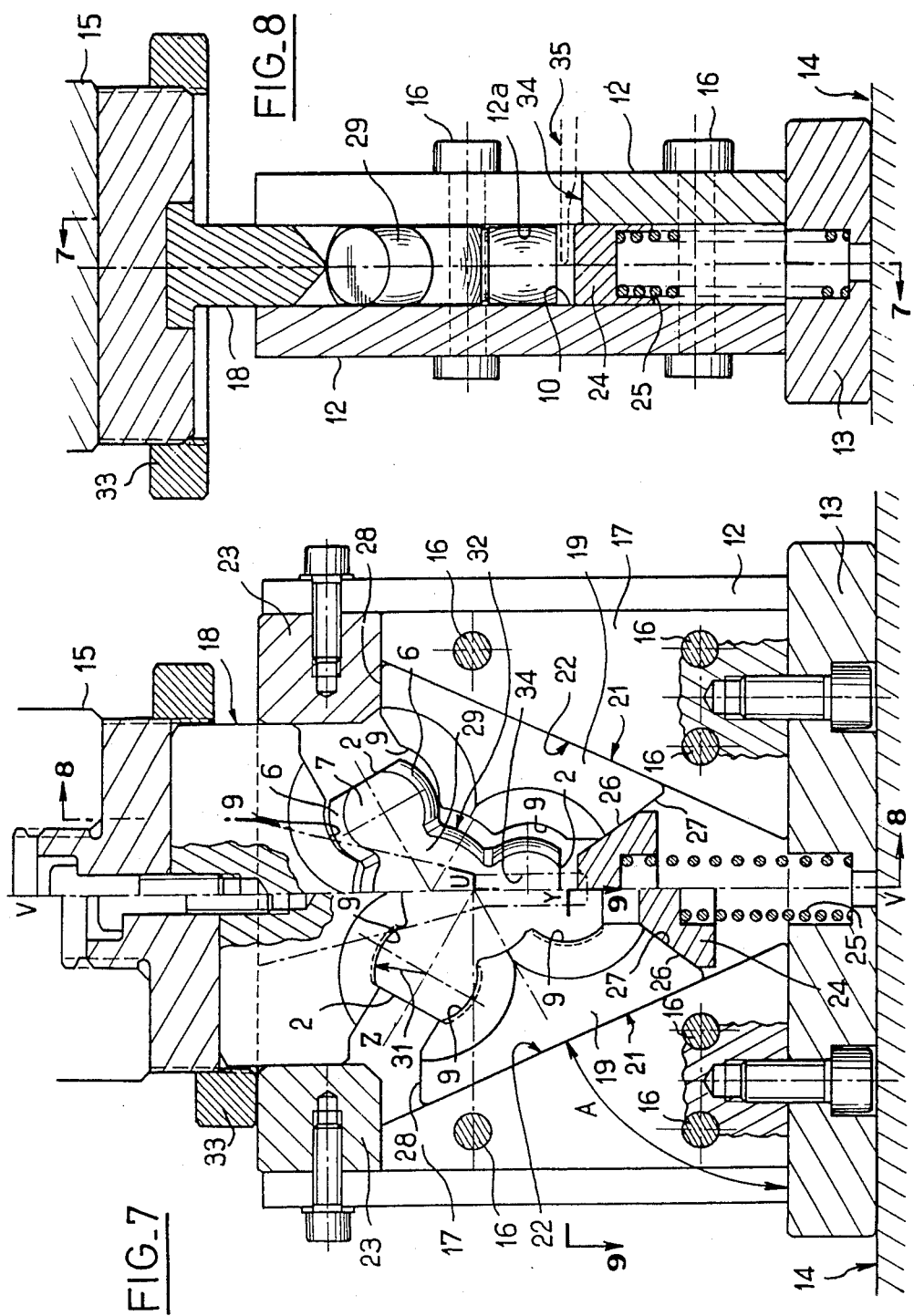

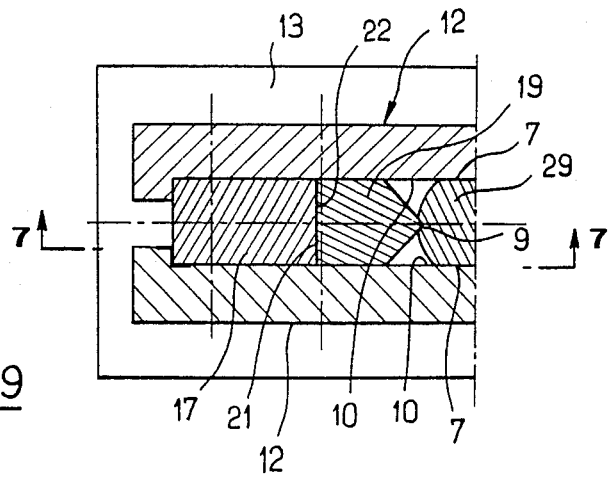
FIG_9
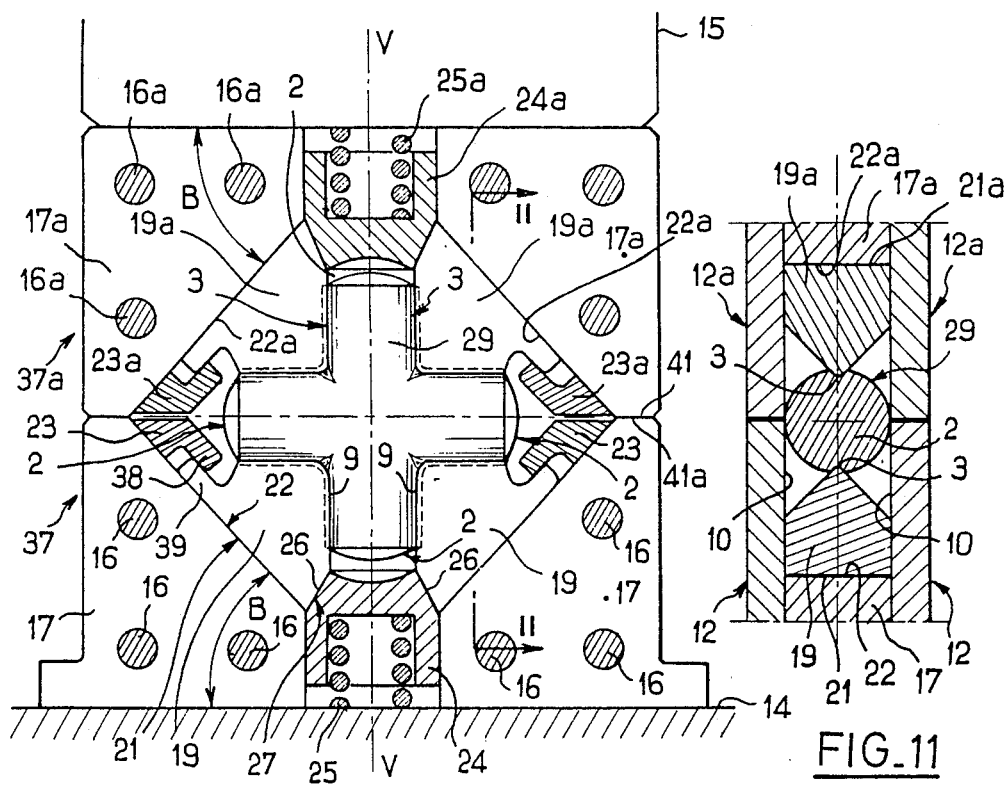
FIG_10
FIG_11

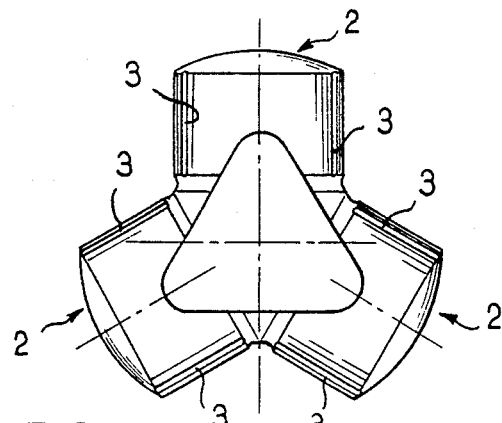
FIG_12
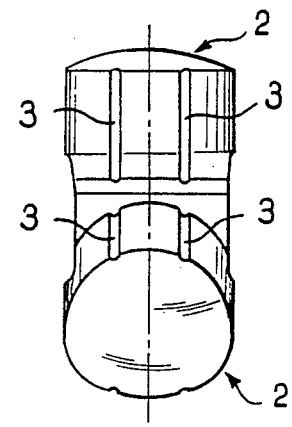
FIG_13
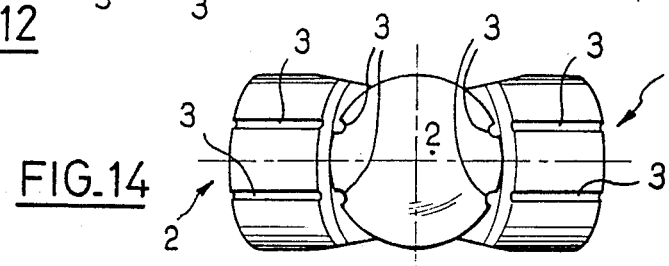
FIG_14
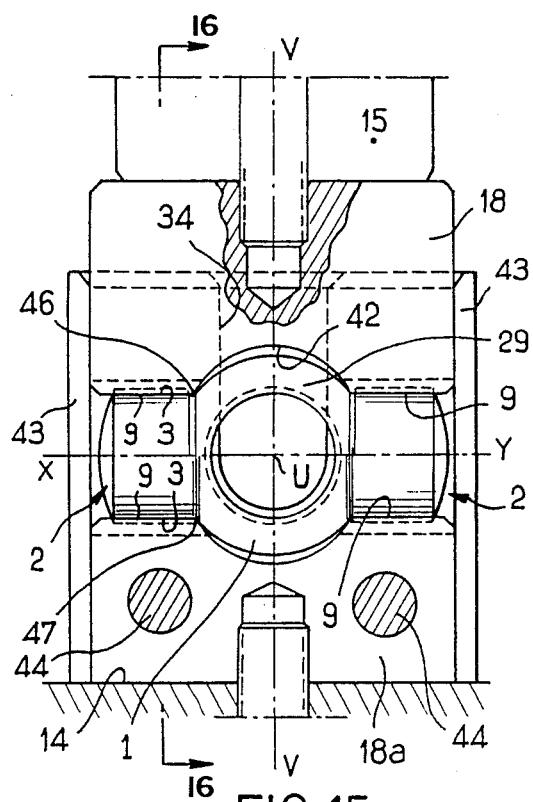
FIG_15
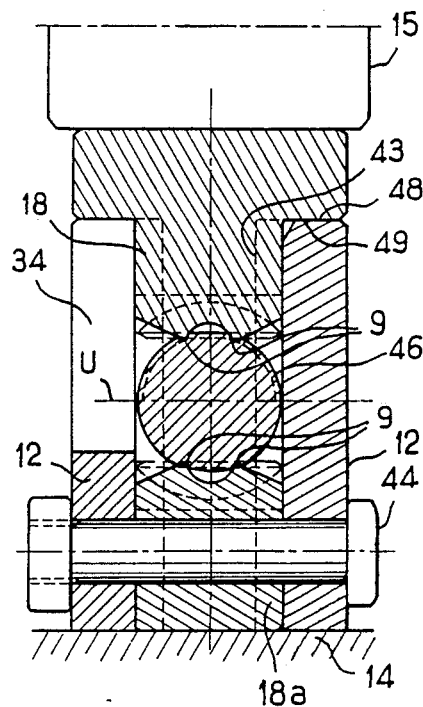
FIG_16

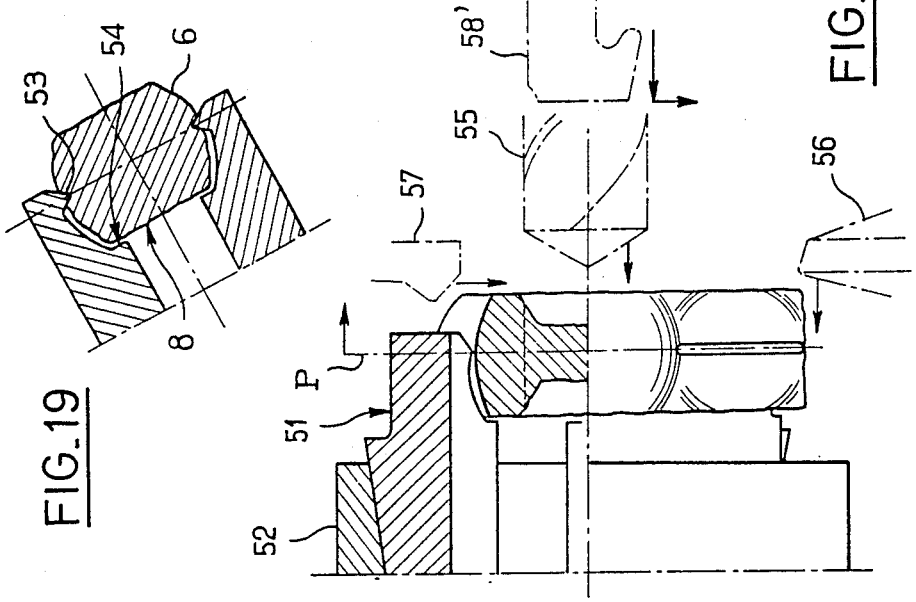
FIG.18
FIG.19
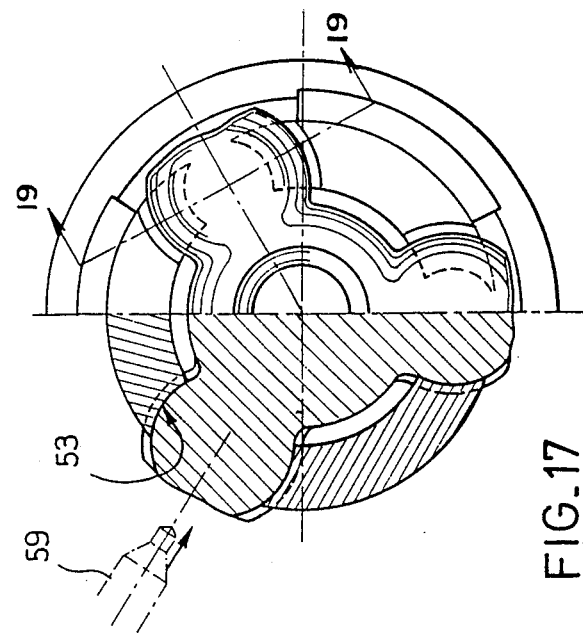
FIG.17

METHOD FOR MANUFACTURING AN ELEMENT HAVING GROOVED TRUNNIONS AND FORMING METHOD FOR GROOVING THE TRUNNIONS

BACKGROUND OF THE INVENTION

The present invention relates to a method for forming grooves, for example longitudinal lubrication grooves, on the trunnions of a blank in which such trunnions are disposed radially about a central axis.

The present invention also relates to a method for manufacturing an element having radial trunnions provided with grooves.

The present invention further relates to a forming tool interposed between two press elements for forming grooves, for example lubrication grooves, in the radial trunnions of a blank.

Homokinetic joints are known which comprise elements having two, three or four radial cylindrical or spherical trunnions which are in smooth bearing relation to other elements of the force transmitting chain in the joint, for example rollers or roller segments rolling along axial inner raceways of a cylindrical part, or pivotal shoes or cups.

The capacity of these joints is markedly increased and their operating temperature reduced in an interesting manner when the trunnions are provided with lubrication grooves extending in a direction perpendicular to the mean direction of the relative movement between the bearing surfaces of each trunnion and the corresponding inner bearing surface of the force-transmitting element pivoting or oscillating on these trunnions.

It is consequently desirable to provide the active surface of these trunnions with lubrication grooves located in an axial plane of the trunnions substantially in alignment with the mean position of the load. Thus, the grooves must be located substantially in the poly-axial plane of the blank, i.e., the plane containing the axes of the individual trunnions perpendicular to the central axis of the trunnion element.

However, the great cost involved in the machining of such grooves in mass production by known means has been found to be dissuasive.

SUMMARY OF THE INVENTION

An object of the present invention is to permit the forming of said grooves, or like grooves, in a rapid, reliable and very economical manner which contributes to not only maintaining the investment costs low but also to facilitating and increasing the rate of production.

According to the invention, the method for forming grooves on trunnions of a blank in which the trunnions are disposed radially about a central axis, comprises positioning the blank between two surfaces defining parallel planar guides and between punches which each occupy, between said guides, a circumferential space between two trunnions of the blank and have at least one forming edge in a facing relation to each of said two trunnions, and imparting to the punch movement relative to the blank in a direction toward the center of the blank, a self-positioning of the blank being effected between the forming edges of the punches due to the sliding of the blank between said two surfaces.

Thus, if it is considered that the active surface of each trunnion is defined by two semi-bearing surfaces either one of which is operative to bear a force acting in the direction of transmission of the force in the joint, each punch forms grooves in two neighboring semi-bearing surfaces, as taken in the circumferential direction of the blank, and associated with two different trunnions.

All of the punches, or at least the lower punch or punches, constitutes or constitute means which support and position the blank before the forming operation. The lateral positioning of the blank is ensured by the two surfaces defining the parallel planar guides.

During the forming operation, the blank assumes, between the punches, a position corresponding substantially to the equilibrium of the forming forces applied on its trunnions, which substantially corresponds to an equal depth of the different grooves.

Consequently, in a single operation, all of the lubrication grooves are produced on the blank with excellent precision and without the need to resort to precise handling in the course of manufacture.

According to another aspect of the invention, the method for manufacturing an element having trunnions disposed radially about a central axis and provided with grooves, comprises, for forming the grooves, positioning a blank between two surfaces defining parallel planar guides, and between punches each of which occupies, between said guides, a circumferential space between two trunnions of the blank and has at least one forming edge in facing relation to each of said two trunnions, imparting to the punches movement relative to the blank in a direction toward the axis of the blank between said two surfaces, then subjecting the blank to a hardening heat treatment and grinding at least one bearing surface of each of the trunnions.

According to a third aspect of the invention, the forming tool interposed between two press elements which are movable toward each other during the forming operation so as to form grooves in the radial trunnions of a blank, comprises punches occupying, during the forming operation, circumferential spaces located between the trunnions, each punch comprising at least one forming edge for each of the adjacent trunnions, and each punch being slidable relative to either one of the two press elements so as to undergo, relative to the blank, movement toward the center of the blank in a direction intermediate between the axes of two trunnions adjacent to the punch.

BRIEF DESCRIPTION OF THE DRAWINGS

Further features and advantages of the invention will be apparent from the following description taken in conjunction with the accompanying drawings, showing non-limitative examples of the invention, in which:

FIG. 1 is an axial front view of a tripod element of a homokinetic joint showing a section of one of the trunnions and a roller cooperating with another trunnion;

FIG. 2 is an axial side sectional view of the tripod element shown in FIG. 1, the upper trunnion not being in section;

FIG. 3 is a sectional view taken along line III—III of FIG. 1;

FIG. 4 is an axial front view of a tripod element having spherical bearing surfaces;

FIG. 5 is a side elevational view of the tripod element of FIG. 4;

FIG. 6 is a sectional view taken along line VI—VI of FIG. 4, showing two stages of the forming of the grooves;

FIG. 7 is a sectional view of a forming tool according to the invention taken along line VII—VII of FIGS. 8 and 9, the right part of the tool being shown in a clearing position and the left part in a forming position;

FIG. 8 is a sectional view taken along line VIII—VIII of FIG. 7;

FIG. 9 is a partial sectional view taken along line IX—IX of FIG. 7;

FIG. 10 is a view similar to FIG. 7 but of another embodiment of the tool according to the invention;

FIG. 11 is a sectional view taken along part of the line XI—XI of FIG. 10;

FIG. 12 is an axial front view of a tripod element comprising two lubrication grooves on each semi-bearing surface of a trunnion;

FIG. 13 is a side elevational view of the tripod element of FIG. 12;

FIG. 14 is a plan view of the tripod element of FIG. 12;

FIG. 15 is a view similar to FIG. 10 but of a third embodiment of the tool;

FIG. 16 is a sectional view taken along line XVI—XVI of FIG. 15;

FIG. 17 is a front elevational view of the blank after formation of the grooves, held in a chuck for the purpose of being subjected to subsequent machining, and partially in section as taken in the plane of the grooves;

FIG. 18 is a side elevational view, partially in section, of the device of FIG. 17, and FIG. 19 is a sectional view taken along line XIX—XIX of FIG. 17.

DETAILED DESCRIPTION OF THE PREFERRED EMBODIMENTS

The tripod element of the homokinetic joint shown in FIGS. 1 to 3 comprises a central body or hub 1 having an axis U from which extend three trunnions 2, having a generally cylindrical shape and axes UX, UY, UZ extending radially relative to the general axis U and spaced 120° apart.

Each trunnion 2 defines along each of its two diametrically opposed generatrices contained in the poly-axial plane P containing the axes UX, UY, UZ, a lubrication groove which is very difficult to produce by machining. Although the grooves 3 considerably improve the lubrication of the smooth bearing contact between the trunnions 2 and the rollers or roller segments against which these trunnions bear during operation, such grooves are not at the present time employed in mass production owing to their prohibitive cost.

FIG. 1 shows a roller 4 in a smooth bearing relationship with one of the two semi-bearing surfaces of one of the trunnions 2.

In the embodiment shown in FIGS. 4 and 5, from the central body 1 of the tripod element extend, along the axes UX, UY, UZ, three trunnions 2 each defining two spherical semi-bearing surfaces 6 separated from one another by flat surfaces 7 parallel to the plane P. The body or hub 1 of the tripod element is itself defined on each side of the plane P by two surfaces 8 located approximately in the same plane as the flat surfaces 7 of the trunnions 2.

Here again, it is desired to form in each trunnion two diametrically opposed grooves 3 located in the plane P.

The basic idea of the invention is to form these grooves 3, and those of the tripod element of FIGS. 1 to 3, by a cold forming operation. In other words, as shown in FIG. 6, the edge 9 of a punch 11 is pressed into the wall (spherical in the presently-described embodiment) of a semi-bearing surface 6 so as to form the grooves 3 therein. In the left part of FIG. 6 the edge 9 is to be brought toward the semi-bearing surface 6 and in the right part of FIG. 6, the tool 11 has already at least partly formed the groove 3.

As shown in FIG. 4, the grooves 3 may be formed in the blank straight from the press die or forging die (left trunnion) or in the finished turned blank (the other two trunnions of FIG. 4) before the final hardening heat treatment and grinding of the bearing surfaces.

The forming tool according to the invention comprises two side walls 12 (FIG. 7) bolted or fixed by any other means to a base 13 placed on the press table. The side walls 12 present, in facing relation, two planar guide surfaces which are parallel to each other and to the axis VV of the tooling, extending vertically in FIGS. 7 and 8 and along which axis the two press elements, namely the press table 14 and a press piston 15, move toward each other during the active stroke of the press. The side walls 12 are bolted to each other by bolts 16 and have slideways 17 constituting spacer members interposed therebetween.

The side walls 12 receive therebetween, in a sliding manner substantially without clearance, a punch 18 fixed to the press piston 15 and two floating punches 19 each of which bears slidably, at its substantially planar rear surface 21, against a corresponding planar slideway surface 22 of a respective one of the slideways 17. The two surfaces 22, or ramps, are symmetrically disposed on each side of the axis VV of the tooling and extend away from each other from the base 13 toward the piston 15. Each punch 19 is movable along its slideway between an abutment block 23 fixed between the side walls 12, and a wedge 24 which has a generally prismatic shape. Under the action of a compression spring 25, the wedge 24 biases the punches 19 in a direction away from the base 13 toward the abutment blocks 23. The wedge 24 bears, at each of its oblique surfaces 26, against a corresponding oblique surface 27 of one of the punches 19. The surfaces 22 and 27 of each punch intersect with an acute angle defined therebetween so that the force applied by the wedge 24 to each punch 19 comprises a component parallel to the ramp 22 oriented toward the corresponding abutment block 23, and a component oriented toward the ramp 22 and therefore tending to maintain the punch 19 in a bearing relation with the ramp. Under these conditions, the wedge 24 moves along the axis VV and the two punches 19 are always in exactly corresponding positions along the ramps 22.

At their end remote from the wedge 24, the punches 19 have an end surface 28 which also intersects at an acute angle with the sliding surface 21. When the punches 19 are in abutment against the abutment blocks 23 (right part of FIG. 7), the end surfaces 28 bear flat against the corresponding surfaces of the abutment blocks 23. This additionally maintains the punch 19 against the corresponding ramp 22.

The punch 18 slides in a rectangular opening defined jointly by the two side walls 12 and the two abutment blocks 23 all of which are connected to the table 14 of the press during operation.

In the situation represented in the right part of FIG. 7, the punches 19 are in a position hereinafter referred to as the accosting position. The blank 29 as shown in FIG. 4 has been previously positioned against the two lower punches 19 while the press piston was withdrawn to the upper dead center position, the punch 18 thus having been completely clear of the rectangular feeding opening between the abutments 23 and the side walls 12. In this position, the axis UY of the tripod element extends along the axis VV. The lateral positioning of the blank results from the fact that the distance between the inner surfaces 10 of the side walls 12 corresponds, except for a sliding clearance, to the distance between the opposed flat faces 7 of each of the trunnions 2 of the blank 29. The punch 18 was thereafter brought between the side walls 12. At this stage, the three punches 18, 19 define for the blank 29 a notch limiting the blank to a rather precise position. Each punch 18 or 19 occupies one of the circumferential spaces located between two adjacent trunnions 2 and presents, in facing relation to each of the two semi-bearing surfaces 6 adjacent to said space, a forming edge 9 whose cross section corresponds to the desired profile of the grooves, for example such as that shown in FIG. 6. Each forming edge 9 has a concave circular shape with a radius of curvature 31 slightly less than the spherical radius of the finished trunnion. On each punch 18 or 19 the intermediate region 32 located between the two forming edges 9 is preferably set back relative to the hub 1 of the blank of the tripod element.

When the piston 15 of the press descends, the punch 18 bears on the blank 19 to be grooved, which moves along therewith the punches 19 along the ramps 22 of the slideways 17. Thus, while the edges 9 of the upper punch 18 apply a forming force on the upper two semi-bearing surfaces of the tripod element, the lower forming edges 9 of the floating punches 19 move toward each other and apply a forming force on the two semi-bearing surfaces of the lower trunnion. At the same time, the resistance to travel of the punches 19 along the ramps 22 is translated into a forming force applied by the upper edges 9 of the floating punches 19 on the lower semi-bearing surfaces of the two upper trunnions.

In order to produce the desired groove depth, the travel of the press is established by means of an abutment device, which may or may not be adjustable, diagrammatically represented by the screw-threaded ring 33 which abuts, at the end of the punching travel, the abutment blocks 23 (left part of FIG. 7) and the upper edges of the side walls 12.

A notch 34 machined in one or both side walls permits the installation of a system 35, shown diagrammatically by dotted lines in FIG. 8, for ejecting the grooved tripod element after the withdrawal of the punch 18.

The slope of the ramps 22 corresponds to an angle A to the horizontal which is slightly larger than 60° for compensating for the sliding friction and ensure substantially equal forming forces acting to form the six grooves.

During the grooving, the punch 18 moves toward the axis U of the blank 29 in the direction VV which is the bi-sector of the axes UX and UZ of the trunnions on which it effects the grooving. Each floating punch 19 also undergoes, relative to the blank 29, a relative movement toward the axis U along the bi-sector of the axes of the two trunnions on which it effects a grooving.

It will be understood that, for facilitating mass production, this tooling may be easily provided with automatic feeding and ejecting devices of known types permitting operation at a high rate.

In the case where this grooving is effected directly on the part straight from the forging or press die, the grooves thus formed may be advantageously employed, according to the invention, for centering and maintaining the blank between the automatic jaws or tongs of the machine tools in the course of consecutive machining operations such as: boring, chamfering the central aperture, turning of the faces and of the periphery, and possibly the execution of the centerings relative to the axes of the trunnions.

In the embodiment represented in FIGS. 10 and 11, the tool serves to form in the blank 29 of a spider element having four cylindrical trunnions 2, eight grooves 3 located in the poly-axial plane of the spider element.

The tool is shown in FIGS. 10 and 11 in its operative position at the end of the travel for forming the grooves 3. The tool comprises a lower assembly 37 which is adapted to be mounted on the press table 14 and will only be described with respect to the differences therebetween and the assembly mounted on the table 14 in the embodiment of FIGS. 7 to 9.

The two edges 9 of each floating punch 19 each extend along one of the sides of a convex right angle. One of the sides of the right angle is vertical and the other horizontal so as to form a groove 3 respectively in the downwardly extening trunnion and in the lower semi-bearing surface of one of the horizontal trunnions 2. The angle B of the ramps 22 is on the order of 45°, although in practice it is slightly larger than 45°, for example 49° to 54°, in order to compensate for the resistance to sliding so that the depth of the grooves is substantially the same on the trunnions whose axes are horizontal and on the trunnions whose axes are vertical.

The slope of each oblique face 26 of the wedge 24 and the identical slope of the ends 27 of the floating punches 19 are in such that the projecting angle formed by the faces 21 and 27 of each punch 19 is still an acute angle although the angle B is less than the angle A of the embodiment of FIGS. 7 to 9.

Furthermore, as a feature which could also be applied to the tool of FIGS. 7 to 9, the abutment blocks 23 have a flange 38 which overlaps in a sliding manner a flange 39 of the associated floating punch so as to prevent the floating punch 19 from moving away from its ramp 22 irrespective of the position of the floating punch 19 on said ramp. For this purpose, the flange 38 and the flange 39 are in mutual sliding contact at two planar surfaces parallel to the ramp 22.

The tool shown in FIGS. 10 and 11 further comprises an upper assembly 37a which is operationally symmetrical to the assembly 37 relative to a plane perpendicular to the axis V V along which the piston 15 travels with respect to the table 14. Reference numerals followed by the index a are employed for designating the elements of the upper assembly 37a, such as the side walls 12a, the bolts 16a, the slideways 17a, the punches 19a, the ramps 22a, the wedge 24a, the spring 25a, which are similar to the respective elements of the assembly 37 identified by the corresponding reference numerals.

The side walls 12a, the slideways 17a, and the abutment blocks 23a are fixed to the piston 15 of the press.

At the end of the forming stroke, the end 41a remote from the piston 15 of each slideway 17a abuts the end 41 of the confronting slideways 17. The dimensioning is such that, when this bearing occurs, the diametrical distance between the bottoms of the two grooves 3 of a given trunnion 2 has the desired value, which will be the same for all the blanks 29 formed with this tool.

In the illustrated embodiment, the trunnions 2 are cylindrical over their entire periphery, i.e., have no flat surfaces 7. The blank 290 is positioned between the side walls 12 and 12a with the trunnions 2 tangent to the inner surfaces of the side walls.

For the purpose of allowing the withdrawal of the blank with its grooves 3 and the insertion of the following blank which is not yet grooved, the assemblies 37 and 37a are moved apart by a corresponding movement of the piston 15 along the direction VV.

The tool shown in FIGS. 15 and 16 serves to form two grooves 3 in each semi-bearing surface on each trunnion of a blank 29 of a bipod element.

During the forming, the axes UX and UY of the trunnions 2 of the bipod element are perpendicular to the axis VV, i.e., horizontal. As in the embodiment of FIGS. 7 to 9, a punch 18 is fixed to the piston 15 of the press. The punch 18 comprises, in a facing relation to each cylindrical trunnion 2, two rectilinear forming edges 9 which are parallel to the poly-axial plane of the bipod element and disposed symmetrically on each side of the latter. The edges 9 are horizontal. The edges 9 disposed in a facing relation to one of the trunnions lie in a common plane with the edges 9 in facing relation to the other trunnion, and are spaced from the latter by a clearance 42 which accommodates the hub of the blank 29. The punch 18 slides between the side walls 12 (as in the embodiment of FIGS. 7 to 9) and between two heels 43 which each side wall 12 presents beyond each trunnion 2 of the blank 29.

The tool further comprises a punch 18a which is operationally symmetrical to the punch 18 relative to a plane perpendicular to the direction VV. The punch 18a is fixed between the side walls 12 for which it acts as a spacer member, by two bolts 4. The punch 18a is fixed to the table 14 of the press. In the upper part of FIGS. 15 and 16 there is shown the forming of a turned blank comprising clearance grooves 46 at the bases of the trunnions. The lower part of these figures, on the other hand, illustrates the forming of a blank straight from the press or forging die. In the last-mentioned case, the clearance grooves do not exist and the hub 1 of the bipod element is connected to the trunnions 2 through a conventional fillet 47.

One or both of the side walls 12 defines as in the embodiment of FIGS. 7 to 9, an opening 34 for facilitating the feeding and ejection of the blanks. The upper edges 48 of the side walls 12 abut shoulders 49 of the upper punch 18 which ensures a constant dimension between the bottoms of the opposed grooves of each of the trunnions.

It is clear that, irrespective of the number of trunnions of the blank, the method and device according to the invention permit cold forming in a single operation of any number of grooves on each semi-bearing surface. It is envisaged that three or more grooves can be formed on each semi-bearing surface. The invention will then permit, in the case of three grooves on each semi-bearing surface of a spider element, forming twenty-four grooves in a single stroke.

The force required of the press piston is on the order of 5 metric tons for a tripod element of average dimensions and for a single grooving.

FIGS. 12, 13 and 14 illustrate a tripod element in which each cylindrical trunnion has two grooves on each semi-bearing surface.

In all of the described embodiments, each punch forms grooves on two circumferentially adjacent semi-bearing surfaces but which are associated with different trunnions since the blank is freely positioned between two planar guide surfaces it transmits the force applied thereto by at least one of the punches which is directly or indirectly shifted by the piston 13, to the other punches, which, since they are positioned in a fixed or movable manner relative to the table, produce other grooves on other semi-bearing surfaces.

The method of manufacturing an element having grooved radial trunnions, such as a bipod, tripod or spider element, will now be described.

As already mentioned, one starts with a blank made by forging or a press operation, of which the trunnion bearing surfaces are or are not turned, as shown in the example of a tripod element of FIG. 4. Preferably, a blank straight from the forging operation is used on which the lubrication grooves 3 are formed while the blank is still hot or semi-hot from the forging operation. The temperature at which the grooves are formed (for example, in the manner described with reference to FIGS. 6 to 16) takes into account the problems of the resistance of the punches in the hot state, the punching force as a function of the temperature, and the precision of the grooves obtained.

Thereafter, the blank is machined, for example its central bore is formed. For this purpose, as already mentioned, the grooves 3 are employed as reference surfaces by which the blank 29 is gripped between the jaws 51 (FIG. 17) which have a gripping profile substantially identical to the punching profile of the grooving punches 18, 19 (FIG. 7) or of a part of these punches.

FIGS. 17 to 19 illustrate gripping of the blank 29 in the case of a tripod element having spherical trunnions. The jaws or tongs 51 are radially movable in a chuck 52. These jaws each define, at the ends thereof, an edge 53 having the same profile and curvature as the grooves 3 formed on the semi-bearing surfaces 6 of the trunnions.

With the jaws open, the blank is inserted in the chuck until its face 8 abuts a heel 54 of the jaws. Thereafter, the automatic chuck concentrically locks the blank, the edges 53 forcefully fitting into the grooves 3.

All of the grooves are in this way perfectly centred relative to the axis of rotation of the chuck. Moreover, the plane P of these grooves is exactly perpendicular to this axis.

A slight clearance is provided between the heels 54 and the inner face of the blank. Although it may be as forged, this blank is in this way ideally "balanced" about precise machining references constituted by the grooves owing to the manner in which they are simutaneously formed in accordance with the invention.

The machining operation may then be carried out in sequence or for certain cases simutaneously as represented diagrammatically in FIGS. 17 to 19 without dismounting the blank to be machined. For example:

(a) central drilling by means of a drill 55;
(b) exterior turning by means of a tool 56;
(c) turning of the outer face by means of a tool 57;
(d) turning of the inner central bearing face by means of a tool 58.

An indexing (not shown) of the orientation of the stationary chuck permits, if necessary, the machining of the axial centers of the trunnions with centering drills 59, only one of which is shown. The semi-bearing surfaces 6 are ground to the required precise shape after being subjected to a hardening heat treatment.

This manner of producing the bearing surfaces of the trunnions is of particular utility in connection with the use of modern precise and very powerful grinding machines.

What is claimed is:

1. A method of forming grooves on trunnions of a blank in which the trunnions extend radially from a central axis of the blank, said method comprising:

positioning the blank between two surfaces defining parallel planar guides in a manner in which the blank is slidable relative to the guides, and between punches which are disposed between the guides and have forming edges profiled in correspondence with the grooves to be formed such that the punches occupy respective spaces each defined between the guides and two adjacent ones of the trunnions and such that the forming edges confront the trunnions, respectively; and moving at least one of the punches relative to the planar guides in a direction toward the central axis of the blank until the respective ones of the forming edges of the at least one of the punches contact the trunnions and slide the blank relative to the guides until the blank is self-positioned in contact with all of the forming edges; and subsequently imparting relative movement between all of the punches and the blank under a force sufficient to cause all of the punches to move relative to the blank in a direction toward the central axis of the blank so that the forming edges penetrate the trunnions and form grooves therein respectively complementary to the profile of the forming edges.

2. A method of manufacturing an element having grooved trunnions extending radially from a central axis of the element, said method comprising:

providing a blank having trunnions extending radially from a central axis of the blank;

forming grooves in the trunnions of the blank by positioning the blank between two surfaces defining parallel planar guides in a manner in which the blank is slidable relative to the guides, and between punches which are disposed between the guides and have forming edges profiled in correspondence with the grooves to be formed such that the punches occupy respective spaces each defined between the guides and two adjacent ones of the trunnions and such that the forming edges confront the trunnions, respectively, moving at least one of the punches relative to the planar guides in a direction toward the central axis of the blank until the respective ones of the forming edges of the at least one of the punches contact the trunnions and slide the blank relative to the guides until the blank is self-positioned in contact with all of the forming edges, and subsequently imparting relative movement between all of the punches and the blank under a force sufficient to cause all of the punches to move relative to the blank in a direction toward the central axis of the blank so that the forming edges penetrate the trunnions and form grooves therein respectively complementary to the profile of the forming edges;

subsequently subjecting the blank to heat treatment that hardens the blank; and machining at least one surface of each of the trunnions.

3. A method as claimed in claim 2, wherein the forming of the grooves in the trunnions is performed prior to the machining of the trunnions, and the machining of the trunnions comprises grinding.

4. A method as claimed in claim 2, wherein the forming of the grooves in the trunnions is performed prior to the machining of the trunnions, and the machining of the trunnions comprises employing a tool to hold the blank via the grooves formed in the trunnions thereof.

* * * * *